United States Patent
Dall et al.

(10) Patent No.: US 12,399,835 B2
(45) Date of Patent: Aug. 26, 2025

(54) ADDRESS TRANSLATION CIRCUITRY AND METHODS FOR PERFORMING ADDRESS TRANSLATION AND METADATA TABLE WALK USING SAME PORTION OF ADDRESS

(71) Applicant: Arm Limited, Cambridge (GB)

(72) Inventors: Christoffer Dall, Copenhagen (DK); Mark Salling Rutland, Cambridge (GB); Gareth Rhys Stockwell, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/699,127

(22) PCT Filed: Aug. 31, 2022

(86) PCT No.: PCT/GB2022/052221
§ 371 (c)(1),
(2) Date: Apr. 5, 2024

(87) PCT Pub. No.: WO2023/062332
PCT Pub. Date: Apr. 20, 2023

(65) Prior Publication Data
US 2024/0403223 A1 Dec. 5, 2024

(30) Foreign Application Priority Data
Oct. 11, 2021 (GB) .................................... 2114523

(51) Int. Cl.
*G06F 12/1009* (2016.01)
(52) U.S. Cl.
CPC ............... *G06F 12/1009* (2013.01)

(58) Field of Classification Search
CPC .................................................. G06F 12/1009
See application file for complete search history.

(56) References Cited

U.S. PATENT DOCUMENTS

| 2014/0075123 A1* | 3/2014 | Hildesheim ......... G06F 12/1027 711/E12.07 |
| 2017/0277639 A1 | 9/2017 | Awad et al. |

(Continued)

OTHER PUBLICATIONS

International Search and Examination Report for International Application No. GB2114523.0 dated Jul. 6, 2022.

(Continued)

*Primary Examiner* — Chie Yew
(74) *Attorney, Agent, or Firm* — NIXON & VANDERHYE P.C.

(57) ABSTRACT

There is provided address translation circuitry and a method for performing address translation. The address translation circuitry is responsive to receipt of a first address and an identifier to perform an address translation from the first address to a second address by performing a translation table walk comprising one or more translation lookups in a plurality of translation tables that are indexed based on a corresponding portion of the first address. The address translation circuitry is further configured to perform a metadata table walk to determine metadata specific to the identifier and associated with the address translation. The metadata table walk comprises one or more metadata lookups in a plurality of metadata lookup tables, each of the one or more metadata lookups corresponds to one of the one or more translation lookups and is indexed based on a same portion of the first address as that translation.

19 Claims, 13 Drawing Sheets

(56) References Cited

U.S. PATENT DOCUMENTS

Figure 1:
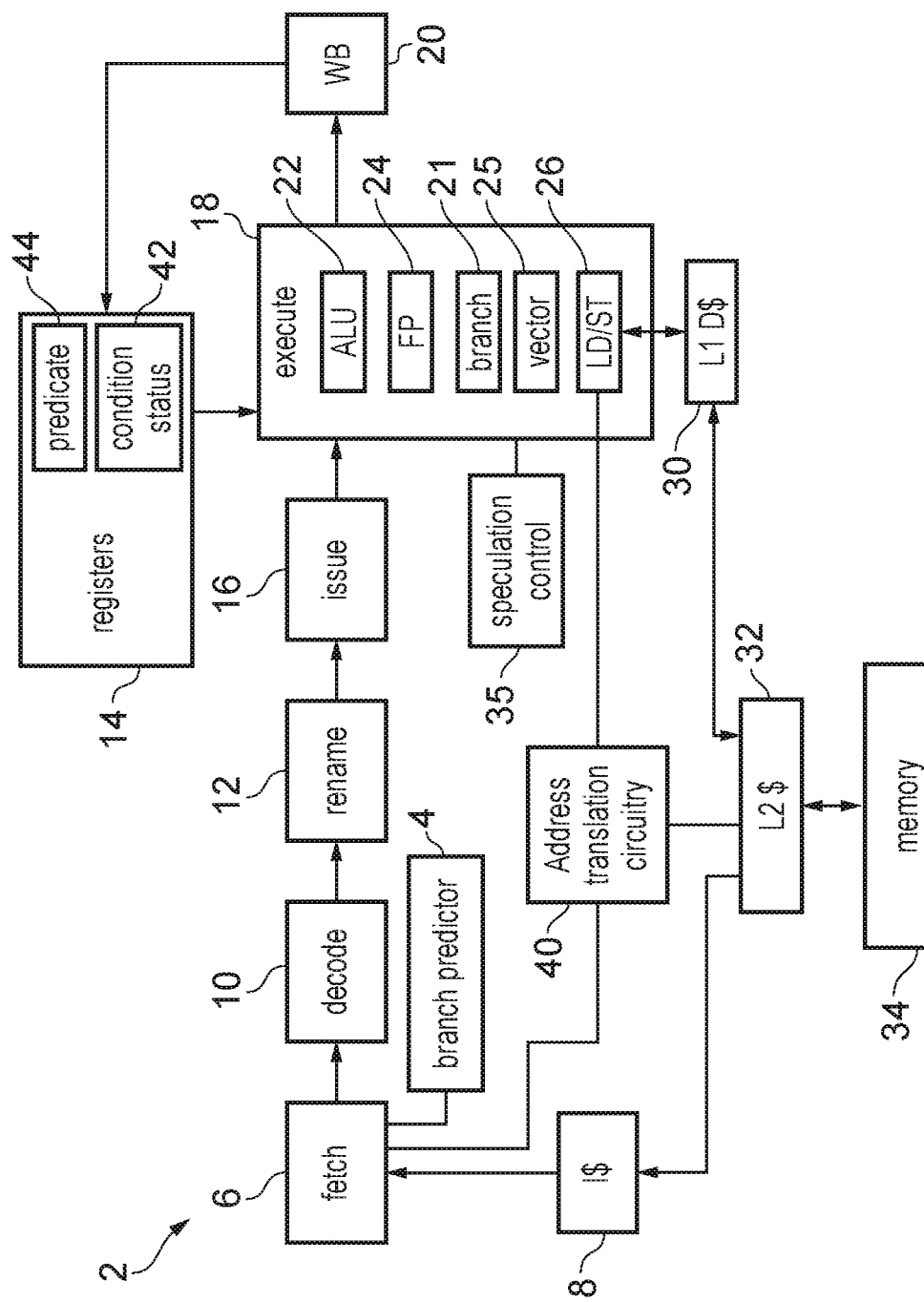

2018/0189190 A1 7/2018 Kaplan et al.
2021/0200673 A1 7/2021 Gupta et al.

OTHER PUBLICATIONS

International Search Report for International application No. PCT/GB2022/052221 dated Oct. 28, 2022.

* cited by examiner

FIG. 8

| | Default permissions | Permissions metadata from sequentially final metadata lookup | Permissions metadata |
|---|---|---|---|
| Additive | R=1, W=0, X=0 / R=X, W=X, X=0 / R=X, W=X, X=X (default) | R=X, W=W, X=X / R=1, W=X, X=X / R=1, W=0, X=1 | R=1, W=W, X=X / R=1, W=X, X=X / R=1, W=X, X=1 |
| Subtractive | (default) | (metadata) | (result) |
| Definitive | (default) | (metadata) | (result) |

| Translation lookaside buffer | | | | | | | |
|---|---|---|---|---|---|---|---|
| Intermediate physical address portion | Physical address portion | Identifier 00 | | | Identifier 01 | | |
| | | R | W | X | R | W | X |
| IPA 0 | IPA 0 | 1 | 1 | 1 | 1 | 1 | 1 |
| IPA 1 | IPA 1 | 1 | 1 | 1 | 1 | 0 | 0 |
| ... | ... | ... | ... | ... | ... | ... | ... |
| IPA N | PA N | 1 | 1 | 0 | 0 | 0 | 0 |

FIG. 9

ADDRESS TRANSLATION CIRCUITRY AND METHODS FOR PERFORMING ADDRESS TRANSLATION AND METADATA TABLE WALK USING SAME PORTION OF ADDRESS

This invention relates to address translation circuitry and methods for performing address translation.

Address translation circuitry is provided to perform translation between a first address and a second address. The translation table walk comprises performing a sequence of translation lookups in a plurality of translation tables indexed based on a portion of the first address.

In some configurations there is provided address translation circuitry responsive to receipt of a first address and an identifier to perform: an address translation from the first address to a second address by performing a translation table walk comprising one or more translation lookups in a plurality of translation tables indexed based on a corresponding portion of the first address; and a metadata table walk to determine metadata specific to the identifier and associated with the address translation, the metadata table walk comprising one or more metadata lookups in a plurality of metadata lookup tables, each of the one or more metadata lookups corresponding to one of the one or more translation lookups and indexed based on a same portion of the first address as that translation lookup.

In some configurations there is provided a method for performing an address translation using address translation circuitry responsive to receipt of a first address and an identifier, the method comprising: performing the address translation from the first address to a second address by performing a translation table walk comprising one or more translation lookups in a plurality of translation tables indexed based on a corresponding portion of the first address; and performing a metadata table walk to determine metadata specific to the identifier and associated with the address translation, the metadata table walk comprising one or more metadata lookups in a plurality of metadata lookup tables, each of the one or more metadata lookups corresponding to one of the one or more translation lookups and indexed based on a same portion of the first address as that translation lookup.

In some configurations there is provided a computer-readable medium to store computer-readable code for fabrication of the address translation circuitry of any preceding claim.

In some configurations the computer-readable medium is a non-transitory computer-readable medium.

Figure 2:
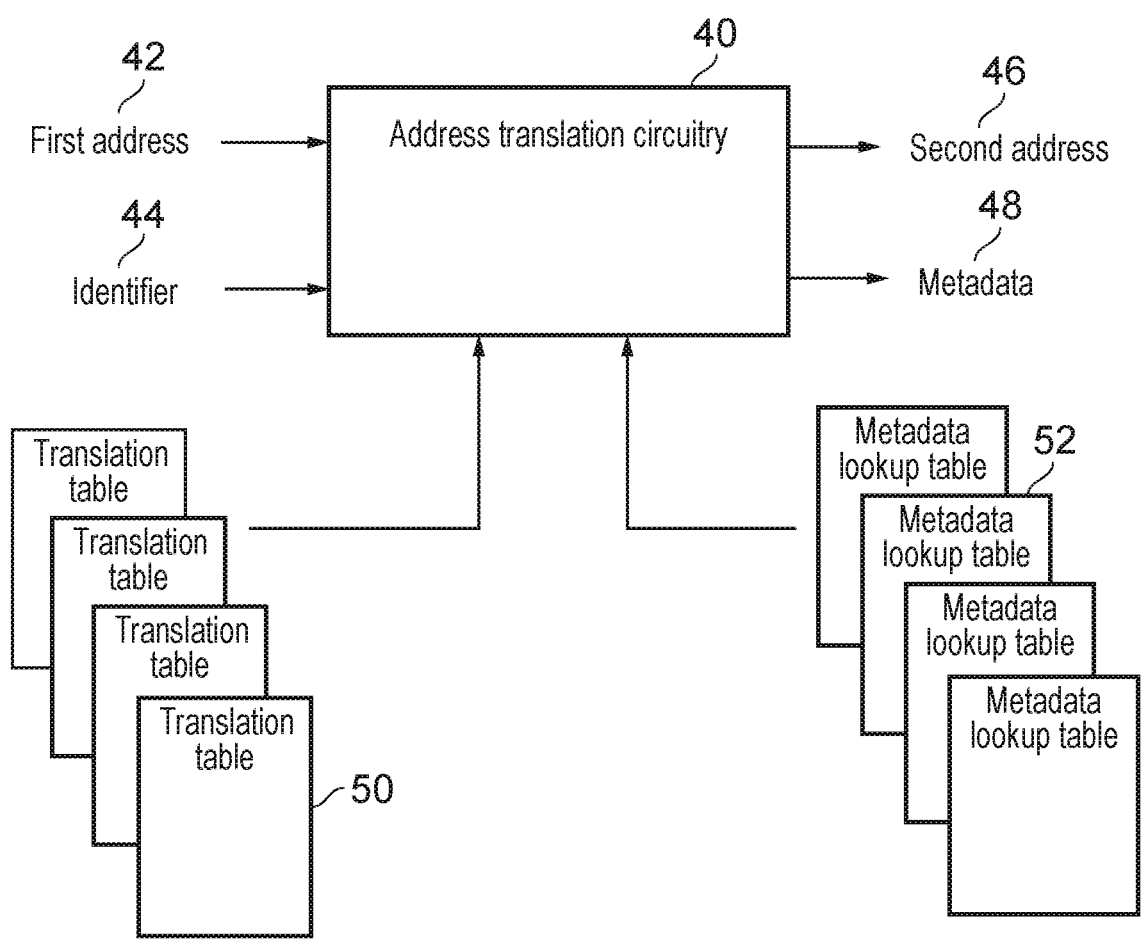
Figure 3:
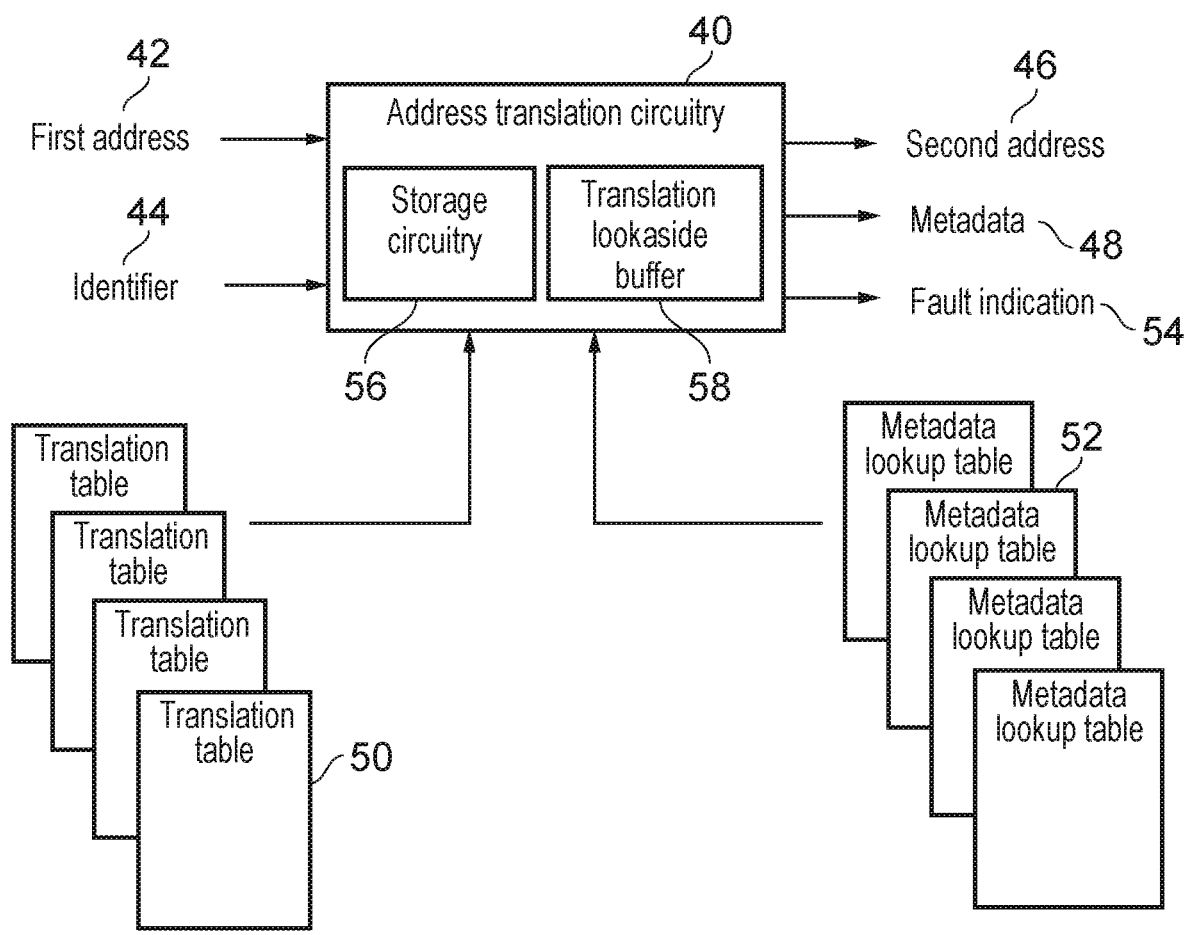
Figure 4A:
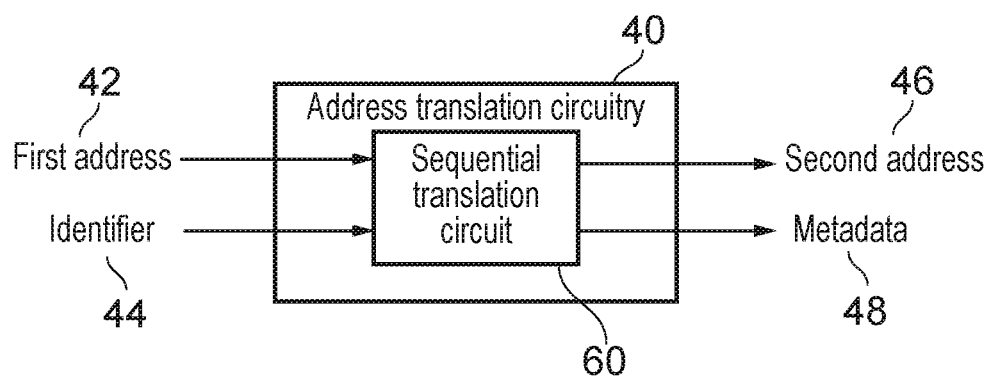
Figure 4B:
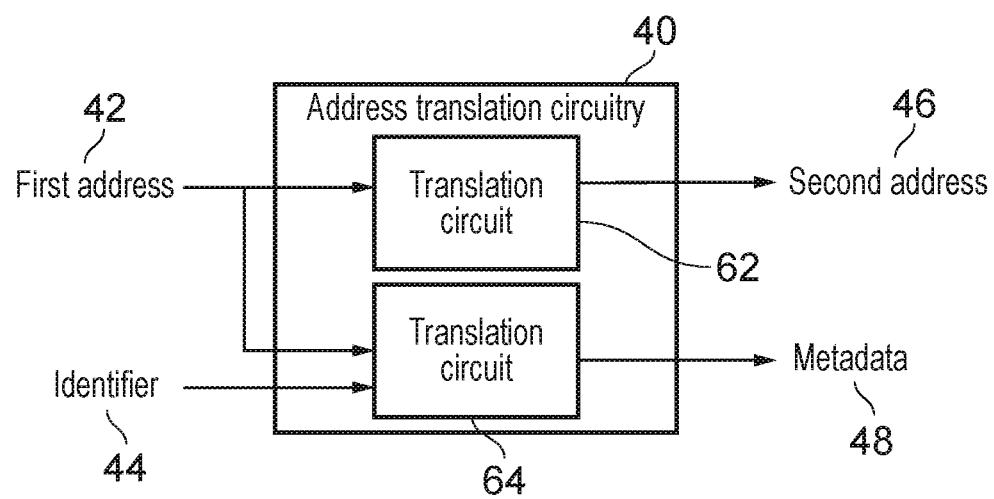
Figure 5A:
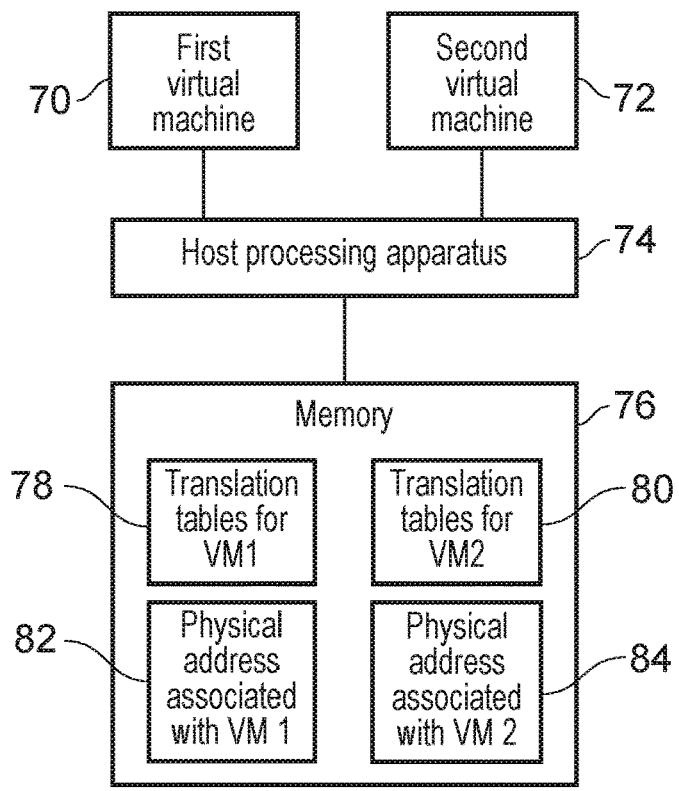
Figure 5B:
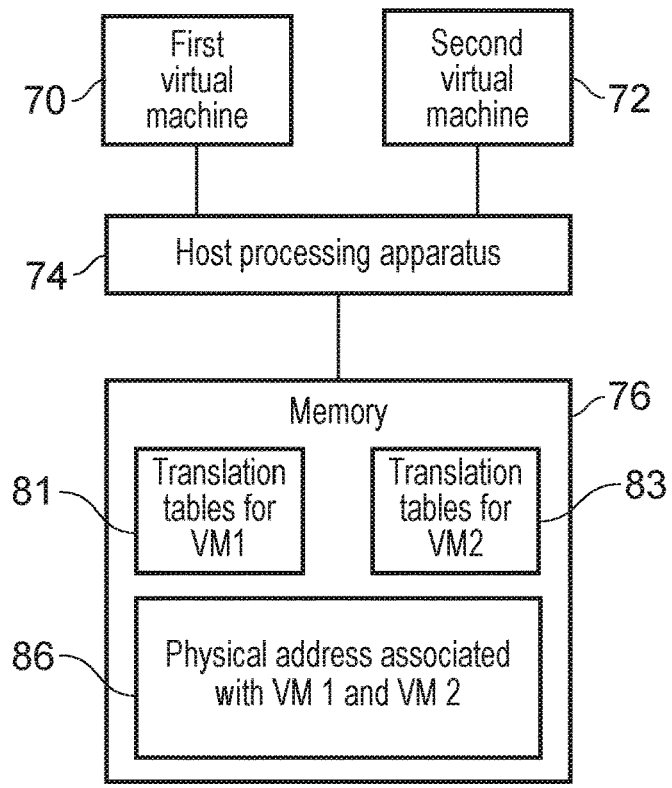
Figure 5C:
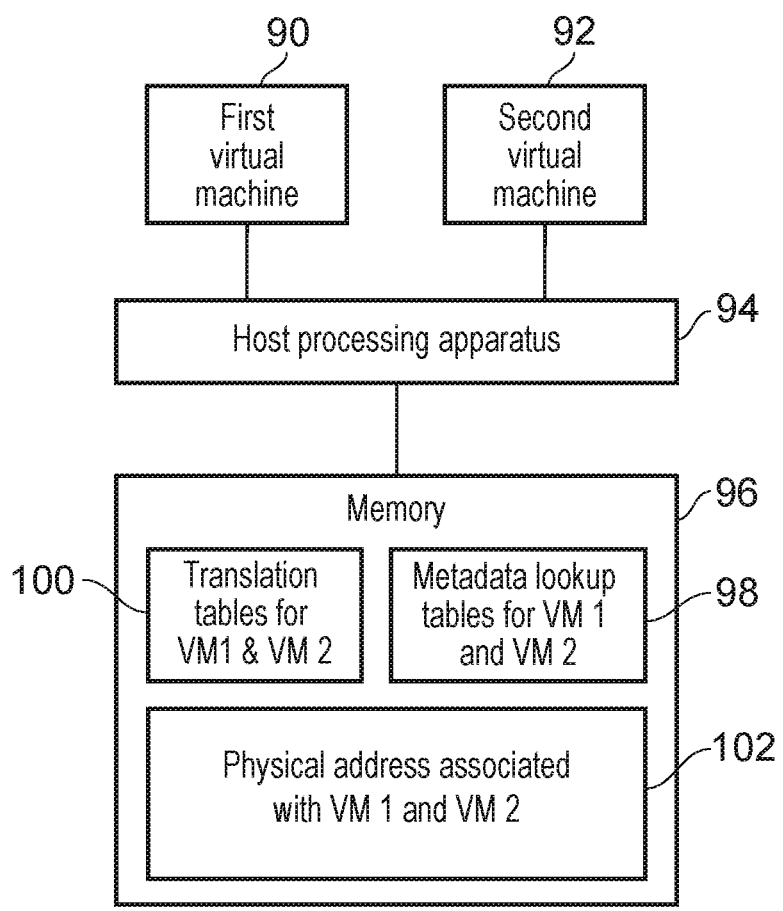
Figure 6:
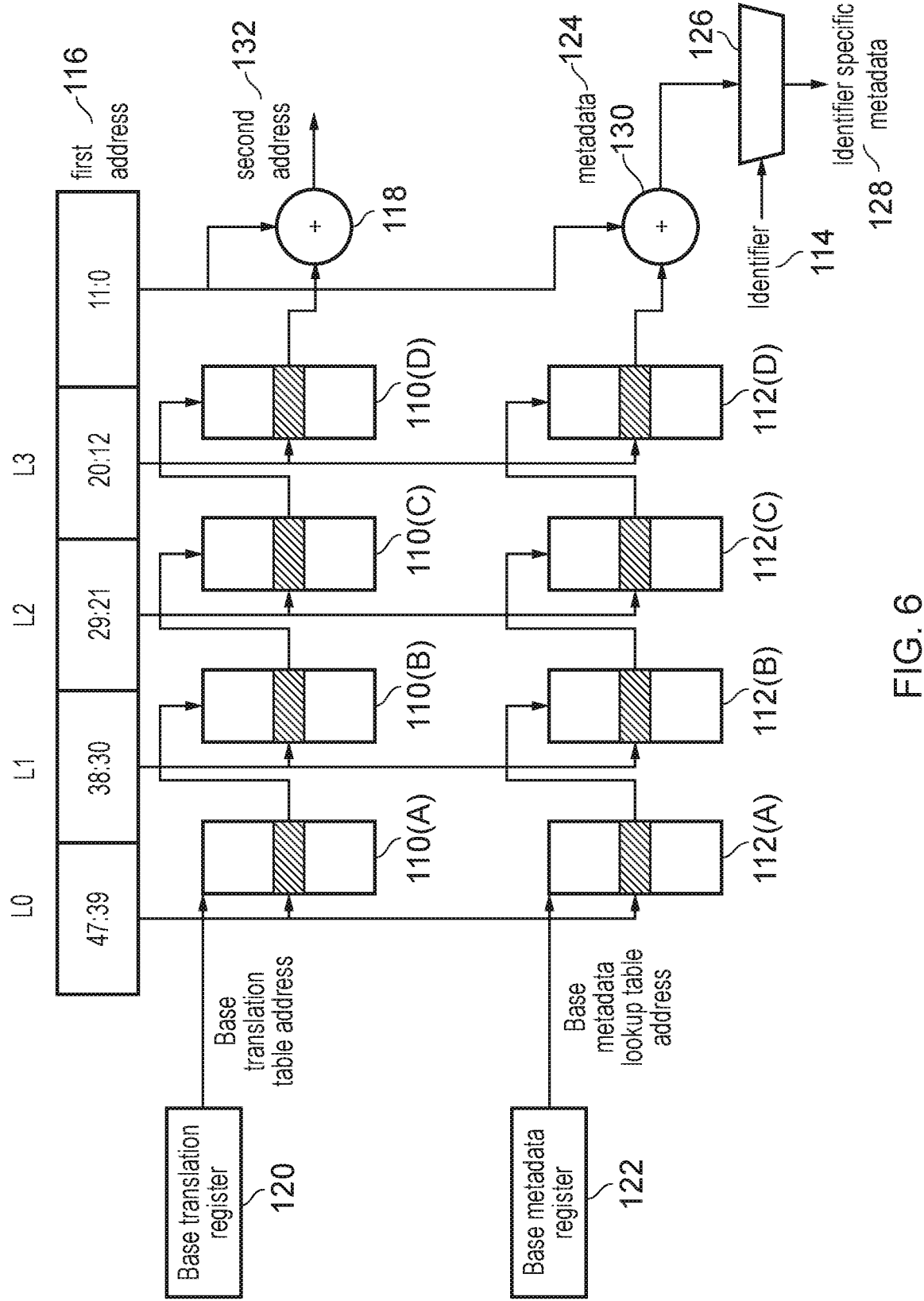
Figure 7A:
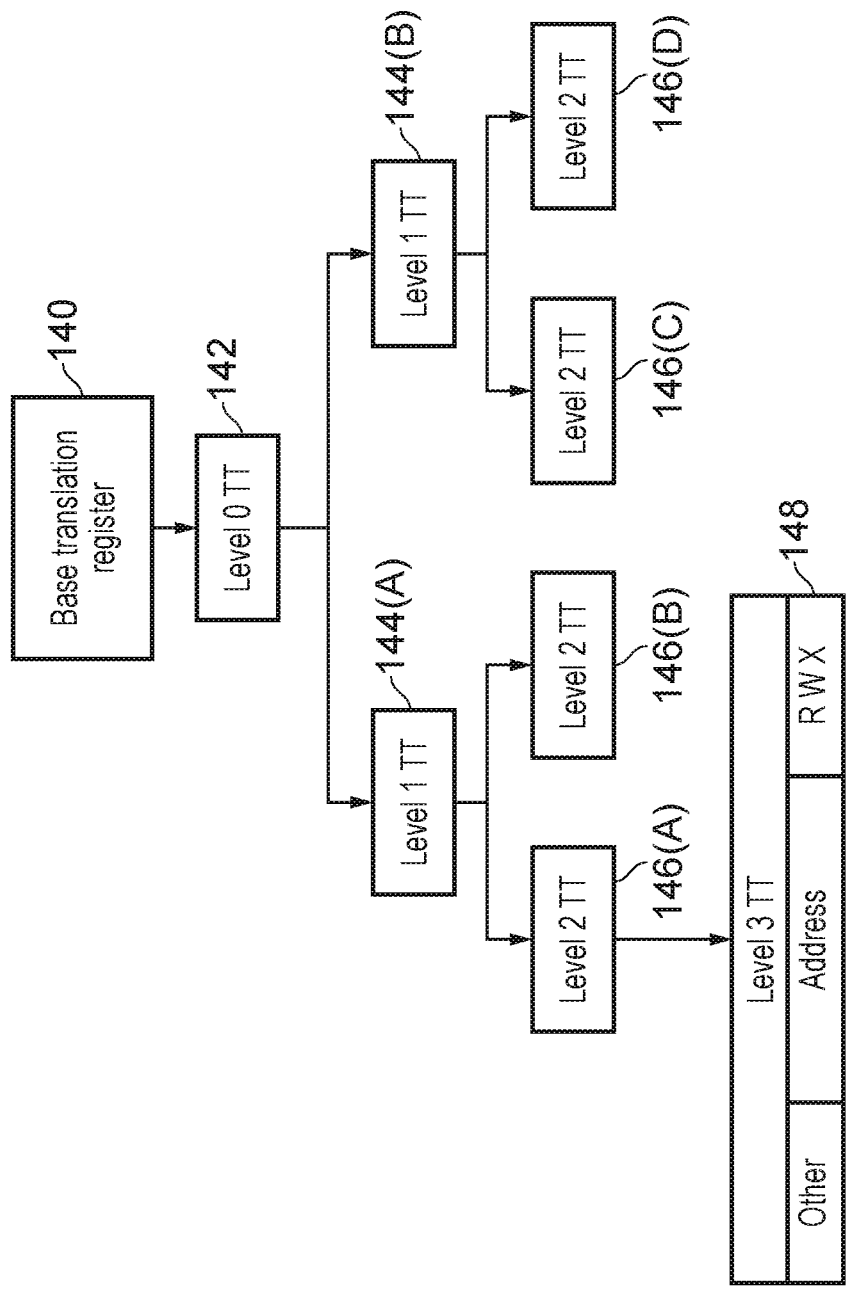
Figure 7B:
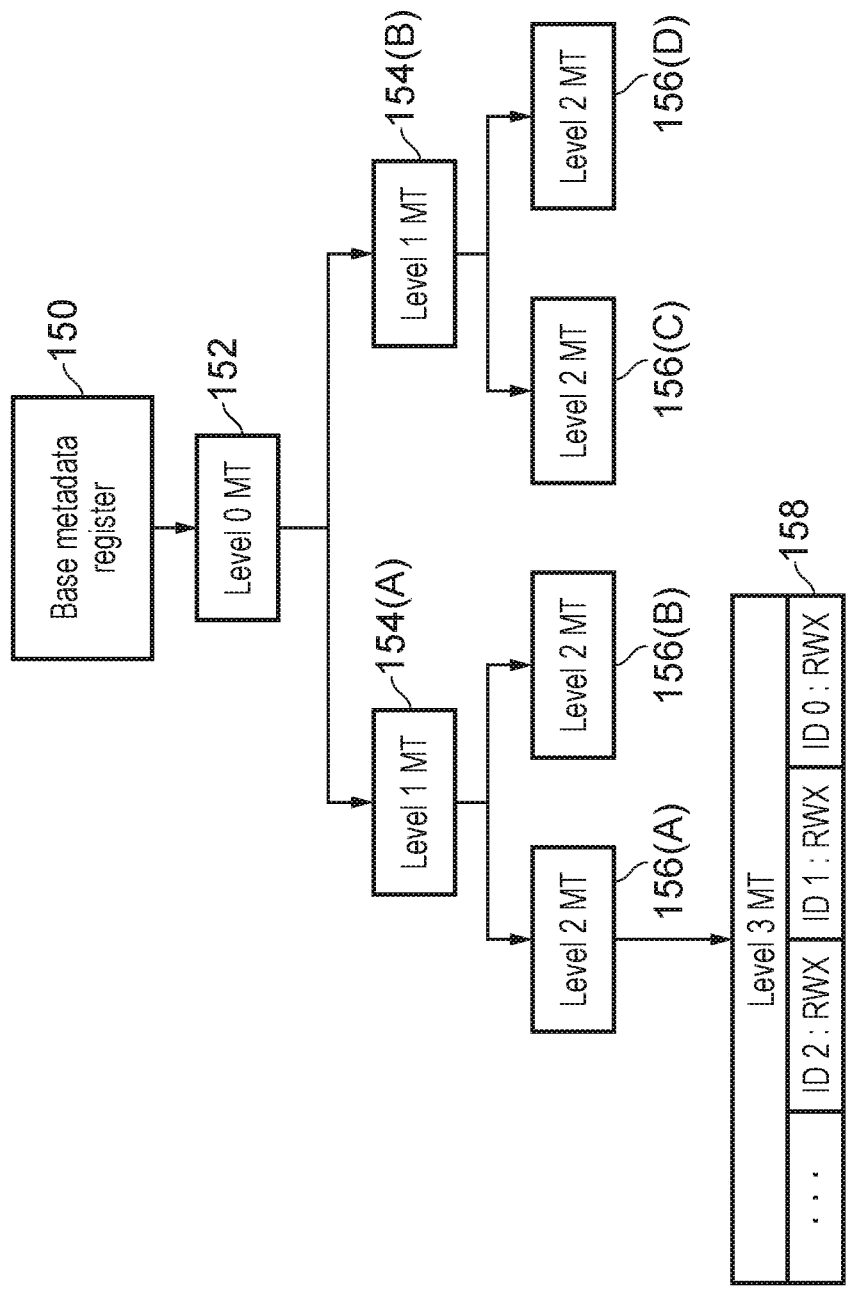
Figure 10:
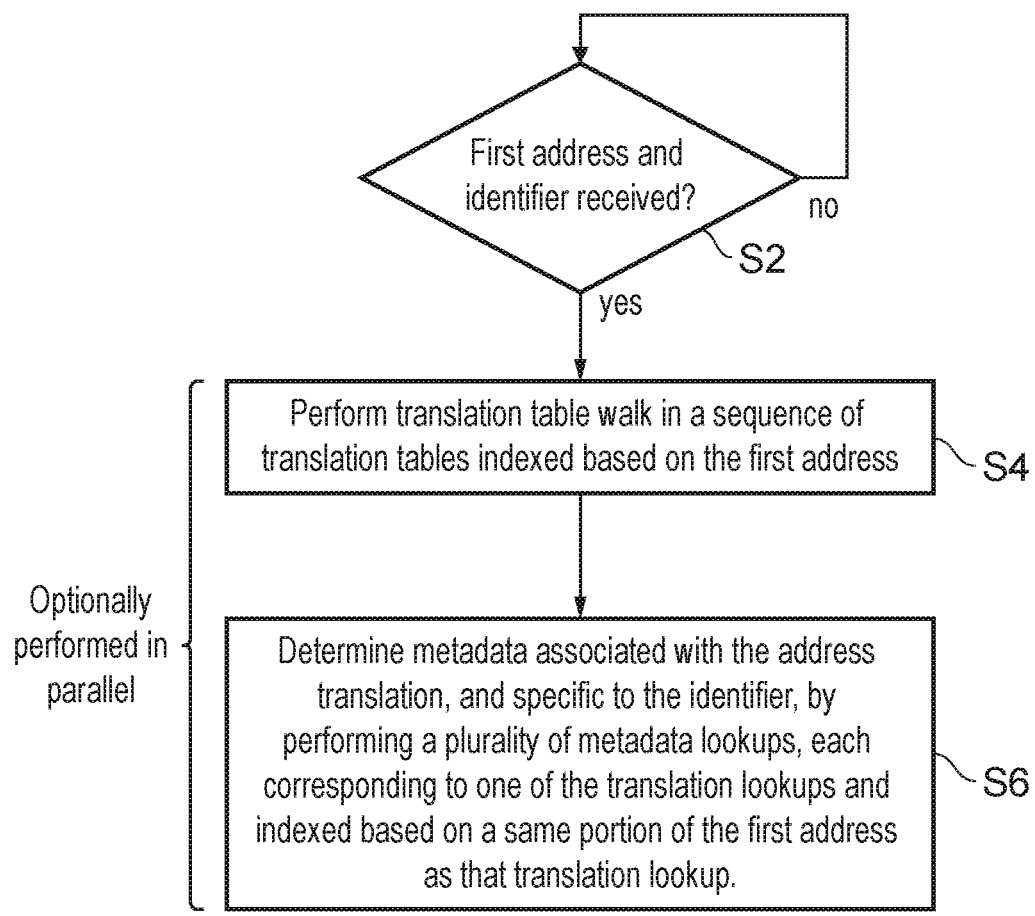
Figure 11:
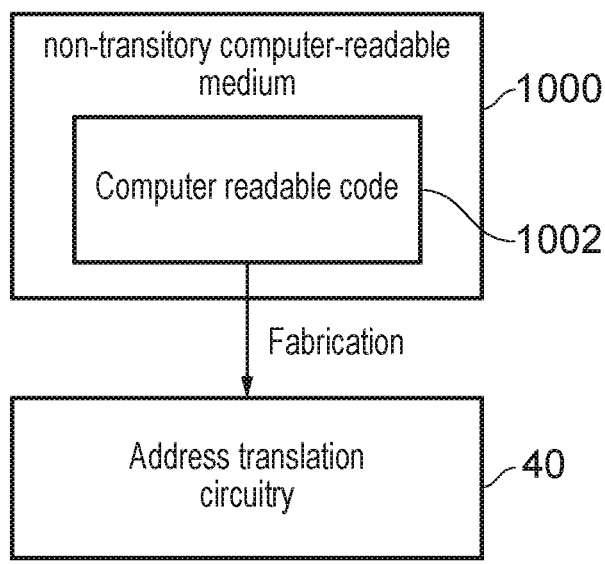

The present techniques will be described further, by way of example only, with reference to embodiments thereof as illustrated in the accompanying drawings, in which:

FIG. 1 schematically illustrates a data processing apparatus according to various configurations of the present techniques;

FIG. 2 schematically illustrates address translation circuitry according to various configurations of the present techniques;

FIG. 3 schematically illustrates further details of address translation circuitry according to various configurations of the present techniques;

FIG. 4a schematically illustrates further details of address translation circuitry according to various configurations of the present techniques;

FIG. 4b schematically illustrates further details of address translation circuitry according to various configurations of the present techniques;

FIG. 5a schematically illustrates the arrangement of translation tables in memory according to typical examples of memory management;

FIG. 5b schematically illustrates the arrangement of translation tables in memory according to typical examples of memory management;

FIG. 5c schematically illustrates the arrangement of translation tables in memory according to various configurations of the present techniques;

FIG. 6 schematically illustrates a translation process using address translation circuitry according to various configurations of the present techniques;

FIG. 7a schematically illustrates a translation table hierarchy according to various configurations of the present techniques;

FIG. 7b schematically illustrates a metadata table hierarchy according to various configurations of the present techniques;

FIG. 8 schematically illustrates methods of determining permissions metadata from default permissions metadata according to various configurations of the present techniques;

FIG. 9 schematically illustrates a layout of a translation lookaside buffer according to various configurations of the present techniques;

FIG. 10 schematically illustrates a sequence of steps carried out by address translation circuitry according to various configurations of the present techniques; and FIG. 11 schematically illustrates the fabrication of address translation circuitry according to various configurations of the present techniques.

In some configurations there is provided address translation circuitry responsive to receipt of a first address and an identifier to perform an address translation from the first address to a second address by performing a translation table walk. The translation table walk comprises one or more translation lookups in a plurality of translation tables which are indexed based on a corresponding portion of the first address. In addition, the address translation circuitry is configured to perform, in response to receipt of the first address, a metadata table walk to determine metadata specific to the identifier and associated with the address translation. The metadata table walk comprises one or more metadata lookups in a plurality of metadata lookup tables, where each of the one or more metadata lookups corresponds to one of the one or more translation lookups and is indexed based on a same portion of the first address as that translation lookup.

Address translation circuitry is often provided to perform a translation between a first address and a second address. In some systems a set of first addresses and a corresponding set of second addresses are shared between a plurality of processes and the process that is requesting the translation is identified using an identifier. However, it is often the case that each of the processes has different metadata that is specific to the second address and that is typically defined by a final translation table of the translation table walk. In such cases address translation circuitry has typically been provided that performs a different translation table walk dependent on the identifier. The inventors have realised that this approach has a number of downsides. First, a complete set of the one or more translation tables are required for each of the plurality of processes doubling the required space for storing the translation tables. Second, if an operating system, controlling the memory, determines that the address translations require remapping then the remapping has to be performed once for each of the different translation tables resulting in an increased processing burden and additional latencies. Hence, there is provided a translation table walk to perform both of a translation table walk to determine an address translation between the first address and the second address, and a metadata table walk to determine metadata that is associated with the address translation that has been performed and that is specific to the identifier. In other words, the metadata is specific to both the identifier and to the second address that has been determined as part of the translation table walk. The metadata table walk and the translation table walk are each determined using the first address. In particular, for each of the one or more translation lookups there is a corresponding metadata lookup where both the translation lookup and the metadata lookup are indexed using a same portion of the first address. The result of the translation table walk is a pointer to a translation table entry that stores the second address and the result of the metadata table walk is a pointer to a metadata table that store metadata associated with the identifier. In this way, only a single set of one or more translation tables is required resulting in a reduced processing burden when a translation table remapping is required. In some configurations the plurality of metadata tables is distinct from the plurality of translation tables. In other words, there is no overlap between the set of tables that are used as translation table and the set of tables that are used as metadata tables.

The timing at which the translation table walk and the metadata table walk is performed can be variously defined. In some configurations the address translation circuitry is configured to perform the translation table walk and the metadata table walk in parallel. In such configurations, at least a portion of the address translation circuitry is duplicated such that the address translation circuitry is able to track the translation table walk and the metadata table walk at a same time. Such configurations reduce the latency associated with performing two table walks at the cost of minimal additional circuitry. Alternatively, in some configurations the address translation circuitry is configured to perform the translation table walk and the metadata table walk sequentially, wherein the translation table walk and the metadata table walk are each performed using a same functional circuit. In such configurations only a single circuit for performing the table walks is provided and the address translation circuitry is configured to perform one of the translation table walk and the metadata table walk sequentially before the other of the translation table walk and the metadata table walk. In some configurations the address translation circuitry is configured to perform the translation table walk prior to the metadata table walk. In such configurations the second address can be returned such that an access, based on the second address, can be initiated before the metadata is returned. The result of the access can then be used or discarded dependent on the returned metadata. This approach has the advantage that the data access can be initiated with no additional latency that may result from the metadata table walk. In alternative configurations, the metadata table walk can be performed sequentially first. Then the address translation circuitry is configured to, dependent on the result of the metadata table walk, either perform the translation table walk or discard the first address and not perform the translation table walk. Advantageously, this approach removes the requirement to perform a subset of translation table walks dependent on the result of the metadata table walk. For example, if the metadata is metadata that determines that accesses based on the address translation should not be performed, then there is no need to perform the translation table walk.

The translation table walk and the metadata table walk are each based on one or more lookups in the corresponding plurality of tables. In some configurations a single translation table is used for the translation table walk resulting in a single translation lookup in the translation table walk, and a single metadata table is used for the metadata table walk resulting in a single metadata lookup in the metadata table walk. However, in some alternative configurations the one or more translation lookups is a plurality of sequential translation lookups; and the one or more metadata lookups is a plurality of sequential metadata lookups. In this way the translation information stored in the translation tables and the metadata stored in the metadata tables can be distributed throughout the memory increasing the ability to dynamically reconfigure the space provided to store the translation tables and the metadata tables.

In some configurations the address translation circuitry is configured to determine the metadata specific to the identifier based on data returned from a sequentially final metadata lookup of the sequential metadata lookups, the data returned from the sequentially final metadata lookup associating a plurality of identifiers with corresponding metadata. The format of the data returned from the sequentially final metadata lookup can be variously defined. In some configurations, the data returned from the sequentially final metadata lookup stores information indicative of the identifier and the corresponding metadata. In such configurations, the address translation circuitry is configured to perform a lookup using the identifier, in the data returned from the sequentially final metadata lookup, in order to determine the corresponding metadata. In other configurations the data returned stores metadata of known length associated with each identifier starting a fixed bit position associated with that identifier. In such configurations, the address translation circuitry is configured to determine the metadata associated with the identifier from the metadata starting at the fixed bit position associated with that identifier.

In some configurations the metadata specific to the identifier is permission metadata. The permission metadata determines access permissions, specific to the identifier, to be used when accessing the second address. In some configurations the permission metadata comprises data indicative of at least one of read, write and execute permissions which define whether a process with the identifier is able to perform read accesses, write accesses, and execute accesses to the second address.

The permissions metadata can be determined from the data returned from the sequentially final metadata lookup in a variety of ways. In some configurations the data returned is the set of read, write and execute permission bits. In such configurations the permissions are determined entirely from the metadata table walk and are independent of the translation table walk. In alternative configurations the address translation circuitry is configured to determine default permission metadata from the address translation; and in response to obtaining the data returned from the sequentially final metadata lookup, determine the permissions metadata by combining the default permission metadata with the data returned from the sequentially final metadata lookup. Typically, translation tables store information indicative of permission bits. Hence, this configuration does not require any modification to the format of the translation tables which could therefore also be read by legacy configurations.

The combination of the default permission metadata and the data returned from the sequentially final lookup can be variously defined. In some configurations the default permission metadata defines a set of maximum permissions associated with the address translation and the data returned from the sequentially final metadata lookup defines a restriction of the set of maximum permissions. In such configurations, the default permissions could be permissions associated with a more privileged process and the data returned from the sequentially final metadata lookup could define further restrictions that are associated, for example, with less privileged processes that share the same set of second addresses. In some configurations, the data returned from the sequentially final metadata lookup could be of a same format as the default permissions data and the data returned from the sequentially final metadata lookup is subtracted from the default permissions data resulting in a reduced set of permissions. The data returned from the sequentially final metadata lookup may be associated with a single permission bit (either read, write or execute). Alternatively, the data returned from the sequentially final metadata lookup may be associated with a plurality of the permissions or all of the permissions.

In some alternative configurations the default permission metadata defines a set of minimum permissions associated with the address translation and the data returned from the sequentially final metadata lookup defines an expansion of the set of minimum permissions. In such configurations, the default permissions could be permissions associated with a less privileged process and the data returned from the sequentially final metadata lookup could define a set of elevated permissions that are associated with a more privileged process accessing the same set of second addresses. In some configurations, the data returned from the sequentially final metadata lookup could be of a same format as the default permissions data and the data returned from the sequentially final metadata lookup is added to the default permissions data. The data returned from the sequentially final metadata lookup may be associated with a single permission bit (either read, write or execute). Alternatively, the data returned from the sequentially final metadata lookup may be associated with a plurality of the permissions or all of the permissions.

The plurality of metadata tables can be defined as a complete set of tables where there is a metadata table for each of the plurality of translation tables. In such configurations a complete metadata table walk will always be possible. However, in some configurations, metadata tables are provided in which metadata tables only exist where there is a difference in the permission data associated with different identifiers. In such configurations the address translation circuitry is configured to, in response to an indication, returned from one of the sequential metadata lookups, that a remaining portion of the sequential metadata lookup is undefined, set the metadata specific to the identifier based on the default permission metadata. Hence, if a metadata lookup returns an invalid entry, the address translation circuitry is still able to provide permissions metadata associated with the second address. By providing address translation circuitry that responds in this way a reduced set of metadata tables are required resulting in a reduction in the storage space required for the metadata tables.

In some configurations the address translation circuitry is configured to, in response to a determination that the identifier is different to each of the plurality of identifiers, trigger a fault indication. In particular, where the sequentially final metadata translation table stores metadata associated with a subset of possible identifiers, the address translation circuitry determines that an absence of permissions data associated with the identifier is an indication that the process associated with that identifier is a process that is not associated with the second address. Hence, the address translation circuitry returns the fault indication without outputting the second address.

In some configurations the address translation circuitry comprises a translation lookaside buffer to store address translations between the first address and the second address and corresponding metadata associated with that address translation. The translation lookaside buffer therefore acts as a cache for translations and stores, in association with the first address, data returned from the translation table walk and data returned from the metadata table walk. The translation lookaside buffer can take a variety of forms. In some configurations, the translation lookaside buffer is a single translation lookaside buffer where a width of each entry is increased to store both of the second address and the data returned from the sequentially final metadata lookup. In this way the translation lookaside buffer can be provided with minimal extra storage. In alternative configurations the translation lookaside buffer comprises plural regions, each associated with a different identifier. This approach requires additional circuitry but allows for a different set of first addresses to be stored for each identifier and, hence, results in a wider coverage of the set of second addresses.

In some configurations the identifier is one of a predefined number of identifiers and the translation lookaside buffer is configured to store, as the corresponding metadata, metadata specific to each of the predefined number of identifiers. In alternative configurations only metadata associated with a subset of the predefined number of identifiers is stored in the translation lookaside buffer and the address translation circuitry is configured to compare the identifier to tag data stored in the translation lookaside buffer in association with the metadata specific to that identifier.

The address translation circuitry can be any structure that provides the function of address translation. However, in some configurations the address translation circuitry is configured to perform address translations in which the first address is an intermediate physical address and the second address is a physical address. An intermediate physical address is an address that has already been translated, for example, by a virtual machine, between a virtual address associated with that virtual machine and the intermediate physical address. In such configurations the address translation is a second state address translation.

In some configurations the identifier identifies a virtual machine of a plurality of virtual machines hosted on data processing circuitry associated with the address translation circuitry, and wherein the plurality of virtual machines shares a same set of second addresses. The plurality of virtual machines sharing the same set of addresses may each have different permissions associated with them. In particular, a more privileged virtual machine may have read, write and execute access to a set of second addresses that a less privileged virtual machine sharing the same set of second addresses is prohibited from accessing. In such a scenario the metadata associated with the less privileged virtual machine would define a reduced set of permissions. In particular, the less privileged virtual machine may be unable to read, write or execute a particular set of second addresses. Using the techniques described herein the metadata translation tables can be configured to define a hole in the mapping between the address translation tables that is specific to the less privileged virtual machine. In the event that data stored at a set of second addresses is moved to a different set of second addresses, it is only the translation tables that need updating in order to redefine the mapping.

The metadata tables are maintained and the hole that has been defined in the mapping remains once the translation tables have been redefined.

In some configurations the address translation circuitry comprises storage circuitry to store: a base translation table address indicative of a sequentially first translation table of the plurality of translation tables; and a base metadata lookup table address indicative of a sequentially first metadata lookup table of the plurality of metadata lookup tables. In configurations for which the metadata table walk and the translation table walk are performed in parallel, the storage circuitry comprises base translation table storage that defines the base translation address and is associated with the functional circuitry that performs the translation table walk. In addition, the storage circuitry comprises base metadata storage that defines the base metadata lookup table address and is associated with the functional circuitry that performs the metadata translation table walk. In configurations for which a single functional unit is provided to perform the translation table walk and the metadata table walk sequentially, the storage circuitry is provided such that the single functional unit is able to access the base metadata lookup table address and the base translation table address. In some configurations the storage circuitry comprises a base translation register to store the base translation table address, and a base metadata register to store the base metadata lookup table address.

In some configurations there is provided a computer-readable medium to store computer-readable code for fabrication of the address translation circuitry according to any of the above configurations. In some configurations, the computer-readable code is used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular example configurations will now be described with reference to the accompanying figures.

FIG. 1 schematically illustrates an example of a data processing apparatus 2 that makes use of address translation circuitry 40 according to various configurations of the present techniques. The data processing apparatus 2 includes a number of stages including a fetch stage 6, a decode stage 10, a rename stage 12, an issue stage 16, an execute stage 18 and a write back stage 20. Instructions move through the pipeline from stage to stage and some instructions may be at one stage at the pipeline while other instructions are pending at another stage. It will be appreciated that this is just an example of a possible pipeline configuration and other examples may have different stage or combinations of stages as required.

The fetch stage 6 fetches instructions, e.g. from an instruction cache. A branch predictor 4 may be provided for predicting the outcomes of branch instructions. The fetched instructions are passed to a decode stage 10 which decodes the instructions to generate decoded instructions which may provide control signals for triggering the execute stage 18 to perform the corresponding processing operation. For some instructions fetched by the fetch stage 6, the decode stage 10 may map the instruction to more than one decoded instruction so that the "instructions" seen by later stages of the pipeline may be in a different form to the instructions fetched from the cache 8. The decoded instructions are passed to a register rename stage 12 for mapping architectural register specifiers specified by the instructions to physical register specifiers identifying corresponding physical registers 14 to be accessed in response to the instructions. The issue stage 16 queues instructions awaiting issue for execution. The execute stage 18 executes instructions which have been issued by the issue stage 16, to carry out various data processing operations in response to the instructions, such as arithmetic or logical operations, or load/store operations to a data cache 30 or a further level cache 32 or memory 34. The execute unit 18 may have a number of execution units 22, 24, 21, 25, including a load store unit 26 for queuing a number of pending load/store operations. The execute units may be capable of speculative execution of one or more instructions and may be provided with speculation control unit 35 to track execution of the speculatively executed instructions. The write back stage 20 writes the results of instructions executed by the execute stage 18 to the physical register file 14 which includes predicate registers 44 and condition status registers 42.

The pipeline also has address translation circuitry 40 for performing translations between a first address and a second address. The address translation circuitry 40 performs translations of first addresses received from the load/store unit 26 and the fetch stage 6 and returns the second address to the load/store unit 26 or the fetch stage 6 from which the first address was received. The address translation circuitry 40 performs the address translation by performing the predetermined maximum number of sequential lookups in page table levels stored in the L2 cache 32 or memory 34.

FIG. 2 provides further details of the address translation circuitry 40 according to some example configurations. The address translation circuitry 40 is configured to, in response to receipt of a first address 42 and an identifier 44, perform an address translation to determine a second address 46. The address translation circuitry 40 determines the second address 46 by performing a translation table walk using a plurality of translation tables 50. In particular, the address translation circuitry 40 performs a sequence of lookups in the translation tables 50. The sequence of lookups comprises a sequence of intermediate lookups in the translation tables 50 and a final lookup in one of the translation tables 50. Each intermediate lookup is indexed based on a portion of the first address 42 and determines an address to be used in a subsequent lookup in one of the translation tables 50. The final lookup is performed, by the address translation circuitry 40, at an address of one of the translation tables 50 defined based on a portion of the first address 42 and determines the second address 46. In addition, the address translation circuitry 40 performs a corresponding sequence of lookups in a plurality of metadata lookup tables 52 in order to determine the metadata 48. In particular, the address translation circuitry 40 performs a sequence of lookups in the metadata lookup tables 52. The sequence of lookups comprises a sequence of intermediate lookups in the metadata lookup tables 52 and a final lookup in one of the metadata lookup tables 52. Each intermediate lookup is indexed based on a same portion of the first address 42 as was used in the corresponding lookup in the translation tables 50 and determines an address to be used in a subsequent lookup in one of the metadata lookup tables 50. The final metadata table lookup is performed by using the address translation circuitry 40, at an address of one of the metadata lookup tables 52 defined based on a same portion of the first address 42 that was used in the final lookup in the translation tables 50. The address translation circuitry 40 is configured to determine the metadata 48 based on the final lookup of the metadata table walk and the identifier 44.

FIG. 3 provides further details of the address translation 40 circuitry according to some example configurations. The address translation circuitry 40 comprises a number of features that are common to the address translation circuitry 40 as illustrated in FIG. 2. These features are described above in relation to FIG. 2. The address translation circuitry 40 is provided with storage circuitry 56 to store a base translation address for performing a first translation lookup in one of the plurality of translation tables 50 and to store a base metadata lookup table address for a first metadata table lookup in one of the plurality of metadata lookup tables 52.

The address translation circuitry 40 is further provided with a translation lookaside buffer 58 to store a plurality of entries defining a correspondence between a first address 42 a second address 46 and metadata 48. The address translation circuitry 40 is arranged to, in response to receipt of the first address 42, perform a lookup in the translation lookaside buffer 58 to determine whether the first address 42 is cached therein. In the event that the address translation circuitry 40 determines that the first address 42 is cached in the translation lookaside buffer 58, then the address translation circuitry determines the second address 46 and the metadata 48 based on the entry that hit in the translation lookaside buffer 58. If, on the other hand, the address translation circuitry 40 determines that the first address 42 is not cached in the translation lookaside buffer 58, then the address translation circuitry 40 performs a translation table walk using the translation tables 50 and a metadata table walk using metadata lookup tables 52 in order to determine the second address 46 and the metadata 48. Once the address translation circuitry 40 has performed the translation table walk and the metadata table walk, the address translation circuitry 40 can generate a new entry in the translation lookaside buffer 58 associating the first address 42 with the second address 46 and the metadata 48. The generation of a new entry for the translation lookaside buffer 58 may require an existing entry of the translation lookaside buffer 58 to be evicted. In such a case, the address translation circuitry 40 can cause one of the existing entries of the translation lookaside buffer 58 to be evicted according to standard cache replacement policies. The address translation circuitry 40 is further provided with circuitry to determine a fault indication 54. The address translation circuitry 40 is arranged to output the fault indication 54 when it is determined that there is no metadata 48 associated with the identifier 44.

FIGS. 4a and 4b schematically illustrate different configurations of the address translation circuitry 40 according to various example configurations. FIG. 4a schematically illustrates an arrangement in which the address translation circuitry 40 is provided with a single sequential translation circuit 60 configured to perform both the translation table walk based on the first address 42 in order to determine the second address 46, and the metadata table walk based on the first address 42 and the identifier 44 in order to determine the metadata 48 that is associated with the second address.

FIG. 4b schematically illustrates an arrangement in which the address translation circuitry 40 is provided with a translation circuit 62 to perform the translation table walk to generate the second address 46 based on the first address 42. The address translation circuitry 40 is also provided with a second translation circuit 64 configured to perform the metadata table walk based on the first address 42 and the identifier 44 in order to determine the metadata 48. By providing the address translation circuitry 40 with a first translation circuit 62 and a second translation circuit 64 the address translation circuitry 40 is able to perform the translation table walk to determine the second address 46 in parallel to the metadata table walk to determine the metadata 48.

FIGS. 5a to 5c schematically illustrate the arrangement of translation tables and metadata lookup tables in physical memory. FIG. 5a schematically illustrates a host processing apparatus 74 in which separate translation tables are provided for a first virtual machine 70 and a second virtual machine 72 hosted by the host processing apparatus 74. This configuration corresponds to a typical approach to storing translation tables. The host processing apparatus 74 is configured to access memory 76 in order to store data at first physical addresses 82 associated with the first virtual machine 70 and at second physical addresses 84 associated with the second virtual machine 72. In order for the host processing apparatus 74 to perform translations between intermediate physical addresses associated the first virtual machine 70 and the first physical addresses 82 associated with the first virtual machine 70, the host processing apparatus 74 stores first translation tables 78. In addition, in order for the host processing apparatus 74 to perform translations between intermediate physical addresses associated the second virtual machine 72 and the second physical addresses 84 associated with the second virtual machine 72, the host processing apparatus 74 stores second translation tables 80. In such configurations, the first physical memory 82, associated with the first virtual machine 70, and the second physical memory 84, associated with the second virtual machine 72, are separated from one another. Hence, each require their own translation tables. In such configurations the metadata associated with the translations is typically stored in the translation tables themselves. In which case, the first translation tables 78 determine physical addresses in the first physical address space 82 that is associated with the first virtual machine 70 and metadata that is associated with the first physical address space 82. In addition, the second translation tables 78 determine physical addresses in the second physical address space 82 that is associated with the second virtual machine 70 and metadata that is associated with the second physical address space 84.

FIG. 5*b* schematically illustrates an alternative arrangement of the physical memory associated with the first virtual machine and the second virtual machine according to a typical approach to storing translation tables. In this configuration the first virtual machine 70 and the second virtual machine 72 are arranged share a same set of physical addresses 86. If the first virtual machine and the second virtual machine were each able to access the same set of physical addresses 86 and, in addition, had the same access permissions associated with each of the set of physical addresses 86 then a same set of translation tables could be provided for each of the first virtual machine 70 and the second virtual machine 72. However, a typical usage requirement is that one of the first virtual machine 70 and the second virtual machine 72 may have a higher privilege level than the other of the first virtual machine 70 and the second virtual machine 72. Hence, it may be desirable that the virtual machine with the higher privilege level has an elevated set of access permissions when accessing the physical address space 86. In order to ensure that these access permissions are respected, in a typical configuration, a first set of translation tables 81 are provided for address translations relating to the first virtual machine 70 where the first set of translation tables 81 defines an intermediate physical address to physical address translation associated with the first virtual machine 70 and the first set of translation tables 81 defines permissions metadata that is associated with each physical address for which a translation is provided. In addition, in the typical configuration, a second set of translation tables 83 are provided for address translations relating to the second virtual machine 72 where the second set of translation tables 83 defines an intermediate physical address to physical address translation associated with the second virtual machine 70 and the second set of translation tables 83 defines permissions metadata that is associated with each physical address for which a translation is provided. In such configurations, if the host processing apparatus 74 were to modify the physical addresses 86 that are associated with the first virtual machine 70 and the second virtual machine 72, then both the first translation tables 81 and the second translation tables 83 would require rewriting resulting in a large processing overhead for the host processing apparatus 74.

In contrast, FIG. 5*c* schematically illustrates a host processing apparatus 94 comprising address translation circuitry 40 according to the present techniques. In particular, the host processing apparatus 94 hosts a first virtual machine 90 and a second virtual machine 92. The first virtual machine 90 and the second virtual machine 92 are arranged to access a same set of physical addresses 102 which are stored in memory 96 associated with the host processing apparatus 94. As discussed in relation to FIG. 5*b*, for cases in which the first virtual machine 90 and the second virtual machine 92 share a same set of physical addresses 102, it is typically required that the permissions metadata associated with the first virtual machine 90 and the second virtual machine 92 is different. In accordance with the present techniques the host processing apparatus 94 stores a set of translation tables that defines the translation between the intermediate physical addresses used by each of the first virtual machine 90 and the second virtual machine 92 and the corresponding physical addresses 102 that are shared between the first virtual machine 90 and the second virtual machine 92. The host processing apparatus 94 also stores, within the memory 96, a set of metadata lookup tables 98 that define the permissions associated with each of the first virtual machine 90 and the second virtual machine 92. If the host processing apparatus 94 were to modify the physical addresses 102 that are associated with the first virtual machine 90 and the second virtual machine 92, then only one set of translation tables, the translation tables 100 would require modification. Hence, processing overhead is reduced. The host processing apparatus 94 comprises address translation circuitry 40 according to the present techniques. In response to receipt of an intermediate physical address (first address) associated with one of the first virtual machine 90 and the second virtual machine 92, the address translation circuitry 40 performs a translation table walk using the translation tables 100 stored in the memory 96. In addition the address translation circuitry 40 uses the intermediate physical address, in combination with an identifier that specifies which of the first virtual machine 90 and the second virtual machine 92 the intermediate physical address originated from, to perform a metadata table lookup in the metadata lookup tables 98 in order to determine the permissions metadata associated with the physical address that was determined from the translation table walk. In this way the same functionality is provided as illustrated in FIG. 5*b* but with the advantage that, if the physical addresses 102 are remapped, then only a single set of translation tables, the translation tables 100, need to be rewritten.

FIG. 6 schematically illustrates the translation between a first address and a second address and a translation between the first address and metadata associated with that second address in accordance with various example configurations. The address translation circuitry 40 receives a first address 116. The address translation circuitry 40 performs a translation table walk based on a series of lookups in translation tables 110 in order to determine a second address 132. In particular, the address translation circuitry 40 determines a base translation address from a base translation register 120. The base translation address is an address of a sequentially first lookup (the L0 lookup) in translation table 110(A). The lookup in the translation table 110(A) is performed using bits 47:39 (bits 47 down to 39) of the first address 116. The result of the lookup in translation table 110(A) provides an address of a second translation table 110(B) which is used in a sequentially second lookup (the L1 lookup). The L1 lookup in the translation table 110(B) is indexed using bits 38:30 of the first address 116. The result of the lookup in translation table 110(B) provides an address of a third translation table 110(C) which is used in a sequentially third lookup (the L2 lookup). The L2 lookup in the translation table 110(C) is indexed using bits 29:21 of the first address 116. The result of the lookup in translation table 110(C) provides an address of a fourth translation table 110(D) which is used in a sequentially fourth lookup (the L3 lookup). The L3 lookup in the translation table 110(D) is indexed using bits 20:12 of the first address 116. The result of the lookup in the translation table 110(D) is combined, using the combining unit 118, with bits 11:0 of the first address 116 to generate the second address 132.

In addition, the address translation circuitry 40 performs a metadata table walk based on a series of metadata lookups in metadata tables 112 in order to determine metadata 124. In particular, the address translation circuitry 40 determines a base metadata address from a base metadata register 122. The base metadata address is an address of a sequentially first lookup (the L0 lookup) in metadata table 112(A). The lookup in the metadata table 112(A) is performed using bits 47:39 of the first address 116. The result of the lookup in metadata table 112(A) provides an address of a second metadata table 112(B) which is used in a sequentially second lookup (the L1 lookup). The L1 lookup in the metadata table 112(B) is indexed using bits 38:30 of the first address 116. The result of the lookup in metadata table 112(B) provides an address of a third metadata table 112(C) which is used in a sequentially third lookup (the L2 lookup). The L2 lookup in the metadata table 112(C) is indexed using bits 29:21 of the first address 116. The result of the lookup in metadata table 112(C) provides an address of a fourth metadata table 112(D) which is used in a sequentially fourth lookup (the L3 lookup). The L3 lookup in the metadata table 112(D) is indexed using bits 20:12 of the first address 116. The result of the lookup in the metadata table 112(D) is combined, using the combining unit 130, with bits 11:0 of the first address 116 to generate the metadata 124. The metadata 124 is provided to lookup unit 126 which performs a lookup, based on the identifier 114, in order to determine identifier specific metadata 128 that is associated with the second address 132. The identifier specific metadata 128 and the second address 132 are returned by the address translation circuitry 40.

In alternative configurations the portions of the first address used for each of the level lookups uses a different number of bits. For example, the L0 lookup may use a different number of bits from the L1 lookup. However, both the L0 lookup in the translation tables and the L0 lookup in the metadata tables uses a same set of bits resulting in a structure of the translation table hierarchy and the metadata table hierarchy being the same.

FIGS. 7a and 7b schematically illustrate a layout of translation tables (TTs) and metadata tables (MTs). FIG. 7a schematically illustrates a layout of translation tables that are associated with the present techniques. Each of the translation tables is associated with a different level lookup performed by the address translation circuitry 40. The level 0 (L0) translation table 142 is determined based on an address stored in the base translation register 140. As discussed in relation to FIG. 6, the address translation circuitry 40 performs a lookup in the L0 translation table 142 to determine which of the plurality of level 1 (L1) translation tables 144 is to be used for the L1 lookup. Next the address translation circuitry performs the L1 lookup in the L1 translation table to determine which of the plurality of level 2 (L2) translation tables 146 is to be used for the L2 lookup. Next the address translation circuitry performs the L2 lookup to determine which of the level 3 (L3) translation tables 148 is to be used for the L3 lookup. Finally, the L3 lookup returns an address portion from which the second address is determined and a set of default read, write and execute bits which are combined with the permission bits determined from the metadata lookup.

FIG. 7b schematically illustrates a layout of the metadata tables corresponding to the translation table layout illustrated in FIG. 7a. Each of the metadata tables is associated with a different level lookup performed by the address translation circuitry 40. The level 0 (L0) metadata table 152 is determined based on an address stored in the base metadata register 150. As discussed in relation to FIG. 6, the address translation circuitry 40 performs a lookup in the L0 metadata table 152 to determine which of the plurality of level 1 (L1) metadata tables 154 is to be used for the L1 lookup. Next the address translation circuitry performs the L1 lookup in the L1 metadata table to determine which of the plurality of level 2 (L2) metadata tables 156 is to be used for the L2 lookup. Next the address translation circuitry performs the L2 lookup to determine which of the level 3 (L3) metadata tables 158 is to be used for the L3 lookup. Finally, the L3 lookup returns a set of permission bits associated with a set of possible identifiers. The address translation circuitry performs a lookup, based on the identifier that is received with the first address, to determine the permission bits associated with that identifier. The address translation circuitry determines the permissions based on a combination of the permission bits associated with that identifier and the default permission bits.

FIG. 8 schematically illustrates how permissions data associated with an identifier is determined from default permissions data and permissions metadata returned from the sequentially final metadata lookup for the cases in which the permissions data are determined additively (the default permissions define a minimum set of permissions and the permissions metadata defines an elevation of the minimum set of permissions), subtractively (the default permissions define a maximum set of permissions and the permissions metadata defines a restriction of the maximum set of permissions), and definitively (the permissions metadata is determined independent of the default permissions).

In the case where the permissions data is determined additively, the permissions metadata is defined, per permission bit, by elevating the default permissions if the permissions metadata from the sequentially final metadata lookup is more permissive than the default permissions metadata. There are two possibilities for this case. Firstly, if the default permissions metadata is a 1 (indicating that the particular permission is allowed) then the resulting permissions metadata is a 1 independent of the permissions metadata returned from the sequentially final metadata lookup. Secondly, if the default permissions metadata is a 0 (indicating that the particular permission is not allowed) then the resulting permissions metadata is determined by the permissions metadata from the sequentially final metadata lookup. Hence, if the permissions metadata from the sequentially final metadata lookup is X (where X=1 or X=0) then the permissions metadata is also equal to X (i.e., the same value of X=1 or X=0). The first example of determining the permissions metadata in the additive case has default permissions metadata RWX=100 and permissions metadata from the sequentially final metadata lookup of RWX=XXX.

In this situation the permissions metadata is RWX=1XX because, when the default permissions data is 1, the permissions metadata is equal to 1 and when the default permissions metadata is 0, the permissions metadata is determined by the permissions metadata from the sequentially final metadata lookup. Similarly, in the case where the default permissions metadata is RWX=XX0 and the permissions metadata from the sequentially final metadata lookup is RWX=101, then the permissions metadata is RWX=1X1.

In the case where the permissions data is determined subtractively, the permissions metadata is defined, per permission bit, by restricting the default permissions if the permissions metadata from the sequentially final metadata lookup is more restrictive than the default permissions metadata. There are two possibilities in this case. Firstly, if the default permissions metadata is a 0 (indicating that the particular permission is not allowed) then the resulting permissions metadata is a 0 independent of the permissions metadata returned from the sequentially final metadata lookup. Secondly, if the default permissions metadata is a 1 (indicating that the particular permission is allowed) then the resulting permissions metadata is determined by the permissions metadata from the sequentially final metadata lookup. Hence, if the permissions metadata from the sequentially final metadata lookup is X (where X=1 or X=0) then the permissions metadata is also equal to X (i.e., the same value of X=0 or X=1). The first example of determining the permissions metadata in the subtractive case has default permissions metadata RWX=100 and permissions metadata from the sequentially final metadata lookup of RWX=XXX. In this situation the permissions metadata is RWX=X00 because, when the default permissions data is 0, the permissions metadata is equal to 0 and when the default permissions metadata is 1, the permissions metadata is determined by the permissions metadata from the sequentially final metadata lookup. Similarly, in the case where the default permissions metadata is RWX=XX0 and the permissions metadata from the sequentially final metadata lookup is RWX=101, then the permissions metadata is RWX=X00.

In the case where the permissions data is determined definitively, the permissions metadata is defined, per permission bit, by the permissions metadata from the sequentially final metadata lookup independent of the default permissions data. The first example of determining the permissions metadata in the definitive case has default permissions metadata RWX=100 and permissions metadata from the sequentially final metadata lookup of RWX=XXX. In this situation the permissions metadata is RWX=XXX. Similarly, in the case where the default permissions metadata is RWX=XX0 and the permissions metadata from the sequentially final metadata lookup is RWX=101, then the permissions metadata is RWX=101.

In the illustrated embodiment the permissions are defined with a logical 1 indicating that the permission is permitted and a logical 0 indicating that the permission is not permitted. In alternative configurations the permissions are encoded using a logical 0 to indicate that the permission is permitted and a logical 1 to indicate that the permission is not permitted. It would be readily apparent to the skilled person that other alternatives for encoding the permissions could be provided.

FIG. 9 schematically illustrates a translation lookaside buffer according to various configurations of the present techniques. The translation lookaside buffer comprises a number of rows in which a portion of an intermediate physical address is associated with a portion of a physical address and a sequence of permissions bits for a particular identifier. In the illustrated embodiment, permissions bits are provided for two identifiers (identifier 00 and identifier 01). In particular, a portion of the intermediate physical address IPA0 is associated with a portion of the physical address PA0 and permission bits RWX=111 associated with identifier 00 and permission bits RWX=111 associated with identifier 01. Hence, the physical address PA0 can be accessed by a virtual machine associated with identifier 00 and can be accessed by a virtual machine associated with identifier 01 for read, write and execute accesses. In addition, a portion of the intermediate physical address IPA1 is associated with a portion of the physical address PA1 and permission bits RWX=111 associated with identifier 00 and permission bits RWX=100 associated with identifier 01. Hence, the physical address PA1 can be accessed by a virtual machine associated with identifier 00 for read, write and execute accesses, and can be accessed by a virtual machine associated with identifier 01 for read accesses only. Finally, a portion of the intermediate physical address IPAN is associated with a portion of the physical address PAN and permission bits RWX=110 associated with identifier 00 and permission bits RWX=000 associated with identifier 01. Hence, the physical address PAN can be accessed by a virtual machine associated with identifier 00 for read and write accesses and cannot be accessed by a virtual machine associated with identifier 01 for any type of accesses.

FIG. 10 schematically illustrates a sequence of steps that are carried out by the address translation circuitry 40 according to various configurations of the present techniques. Flow begins at step S2 where it is determined if a first address and an associated identifier have been received. If no then flow remains at step S2. If, at step S2, it is determined that a first address and an identifier have been received, then flow proceeds to step S4. At step S4 the address translation circuitry 30 performs a translation table walk in a sequence of translation tables in order to determine a second address corresponding to the first address. The translation table walk is indexed based on the first address. Flow then proceeds to step S6 where a metadata table walk is performed in order to determine metadata associated with the address translation that is specific to the identifier. The metadata table walk is performed using a sequence of translation lookups that are indexed based on a same portion of the first address as that translation lookup. In some configurations step S4 and step S6 are performed in parallel.

FIG. 11 schematically illustrates the fabrication of address translation circuitry 40 according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 comprises the address translation circuitry 40 which can be fabricated as the whole of or as part an integrated circuit.

In brief overall summary there is provided address translation circuitry and a method for performing address translation. The address translation circuitry is responsive to receipt of a first address and an identifier to perform an address translation from the first address to a second address by performing a translation table walk comprising one or more translation lookups in a plurality of translation tables that are indexed based on a corresponding portion of the first address. The address translation circuitry is further configured to perform a metadata table walk to determine metadata specific to the identifier and associated with the address translation. The metadata table walk comprises one or more metadata lookups in a plurality of metadata lookup tables, each of the one or more metadata lookups corresponds to one of the one or more translation lookups and is indexed based on a same portion of the first address as that translation lookup.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Address translation circuitry responsive to receipt of a first address and an identifier to perform: an address translation from the first address to a second address by performing a translation table walk comprising one or more translation lookups in a plurality of translation tables indexed based on a corresponding portion of the first address; and a metadata table walk to determine metadata specific to the identifier and associated with the address translation, the metadata table walk comprising one or more metadata lookups in a plurality of metadata lookup tables, each of the one or more metadata lookups corresponding to one of the one or more translation lookups and indexed based on a same portion of the first address as that translation lookup.

2. The address translation circuitry of claim 1, configured to perform the translation table walk and the metadata table walk in parallel.

3. The address translation circuitry of claim 1, configured to perform the translation table walk and the metadata table walk sequentially, wherein the translation table walk and the metadata table walk are each performed using a same functional circuit.

4. The address translation circuitry of claim 1, wherein: the one or more translation lookups is a plurality of sequential translation lookups; and the one or more metadata lookups is a plurality of sequential metadata lookups.

5. The address translation circuitry of claim 4, configured to determine the metadata specific to the identifier based on data returned from a sequentially final metadata lookup of the sequential metadata lookups, the data, returned from the sequentially final metadata lookup, associating a plurality of identifiers with corresponding metadata.

6. The address translation circuitry of claim 5, wherein the metadata specific to the identifier is permission metadata.

7. The address translation circuitry of claim 6, configured to: determine default permission metadata from the address translation; and in response to obtaining the data returned from the sequentially final metadata lookup, determine the permissions metadata by combining the default permission metadata with the data returned from the sequentially final metadata lookup.

8. The address translation circuitry of claim 7, wherein the default permission metadata defines a set of maximum permissions associated with the address translation and the data returned from the sequentially final metadata lookup defines a restriction of the set of maximum permissions.

9. The address translation circuitry of claim 7, wherein the default permission metadata defines a set of minimum permissions associated with the address translation and the data returned from the sequentially final metadata lookup defines an expansion of the set of minimum permissions.

10. The address translation circuitry of claim 5, configured to, in response to an indication, returned from one of the sequential metadata lookups, that a remaining portion of the sequential metadata lookup is undefined, set the metadata specific to the identifier based on default permission metadata.

11. The address translation circuitry of claim 5, configured to, in response to a determination that the identifier is different to each of the plurality of identifiers, trigger a fault indication.

12. The address translation circuitry of claim 1, comprising a translation lookaside buffer to store address translations between the first address and the second address and corresponding metadata associated with that address translation.

13. The address translation circuitry of claim 12, wherein the identifier is one of a predefined number of identifiers and the translation lookaside buffer is configured to store, as the corresponding metadata, metadata specific to each of the predefined number of identifiers.

14. The address translation circuitry of claim 1, wherein the first address is an intermediate physical address and the second address is a physical address.

15. The address translation circuitry of claim 1, wherein the identifier identifies a virtual machine of a plurality of virtual machines hosted on data processing circuitry associated with the address translation circuitry, and wherein the plurality of virtual machines shares a same set of second addresses.

16. The address translation circuitry of claim 1, comprising storage circuitry to store: a base translation table address indicative of a sequentially first translation table of the plurality of translation tables; and a base metadata lookup table address indicative of a sequentially first metadata lookup table of the plurality of metadata lookup tables.

17. The address translation circuitry of claim 16, wherein the storage circuitry comprises a base translation register to store the base translation table address, and a base metadata register to store the base metadata lookup table address.

18. A non-transitory computer-readable medium to store computer-readable code for fabrication of the address translation circuitry of claim 1.

19. A method for performing an address translation using address translation circuitry responsive to receipt of a first address and an identifier, the method comprising: performing the address translation from the first address to a second address by performing a translation table walk comprising one or more translation lookups in a plurality of translation tables indexed based on a corresponding portion of the first address; and performing a metadata table walk to determine metadata specific to the identifier and associated with the address translation, the metadata table walk comprising one or more metadata lookups in a plurality of metadata lookup tables, each of the one or more metadata lookups corresponding to one of the one or more translation lookups and indexed based on a same portion of the first address as that translation lookup.

* * * * *